(12) United States Patent
Peleg

(10) Patent No.: US 10,754,733 B2
(45) Date of Patent: Aug. 25, 2020

(54) SYSTEM AND METHOD FOR MAINFRAME COMPUTERS BACKUP AND RESTORE

(71) Applicant: Gil Peleg, Kiryat Ono (IL)

(72) Inventor: Gil Peleg, Kiryat Ono (IL)

( * ) Notice: Subject to any disclaimer, the term of this patent is extended or adjusted under 35 U.S.C. 154(b) by 0 days.

(21) Appl. No.: 14/800,743

(22) Filed: Jul. 16, 2015

(65) Prior Publication Data

US 2017/0017553 A1   Jan. 19, 2017

(51) Int. Cl.
*G06F 11/14* (2006.01)
*G06F 17/00* (2019.01)

(52) U.S. Cl.
CPC ...... *G06F 11/1464* (2013.01); *G06F 11/1469* (2013.01); *G06F 2201/84* (2013.01)

(58) Field of Classification Search
CPC ........... G06F 11/1464; G06F 17/30076; G06F 11/1458; G06F 11/1469; G06F 2201/84
See application file for complete search history.

(56) References Cited

U.S. PATENT DOCUMENTS

| | | | | |
|---|---|---|---|---|
| 5,455,926 A | * | 10/1995 | Keele | G06F 3/0601 711/112 |
| 6,772,365 B1 | | 8/2004 | Obara | |
| 7,299,294 B1 | * | 11/2007 | Bruck | H04L 29/12216 709/201 |
| 2003/0088720 A1 | | 5/2003 | Fukuzawa | |
| 2004/0006702 A1 | | 1/2004 | Johnson | |
| 2004/0044803 A1 | | 3/2004 | Mashima | |
| 2004/0088507 A1 | * | 5/2004 | Satoyama | G06F 3/0608 711/162 |
| 2005/0038830 A1 | | 2/2005 | Lee | |
| 2007/0271302 A1 | * | 11/2007 | Atkins | G06F 11/1456 |
| 2010/0180075 A1 | | 7/2010 | McCloskey | |
| 2012/0311127 A1 | * | 12/2012 | Kandula | H04W 16/28 709/224 |
| 2013/0159648 A1 | | 6/2013 | Anglin | |

FOREIGN PATENT DOCUMENTS

JP   2004220484 A1   8/2004

OTHER PUBLICATIONS

ISR in related case, PCT/IL2016/050747 (Nov. 13, 2016).

* cited by examiner

*Primary Examiner* — Kannan Shanmugasundaram

(57) ABSTRACT

A computer-implemented method, system and computer program product, the method comprising: receiving a request for backing up data from a mainframe on a backup server implemented on an open system; issuing a call to data set services, the call associated with an exit function; receiving a callback to the exit function, the callback associated with a data set record; packing the data set record to obtain packed information; and transmitting the packed information over a network connection to the backup server for backing up the data, wherein no additional data is written to a persistent memory of the mainframe, and wherein no limitations exist on a number of mainframes connected to the mainframe, or on a number of mainframes simultaneously communicating with the backup server.

8 Claims, 4 Drawing Sheets

SYSTEM AND METHOD FOR MAINFRAME COMPUTERS BACKUP AND RESTORE

TECHNICAL FIELD

The present disclosure relates to mainframe computers in general, and to a system and method for backing up mainframe computers using disk storage, in particular.

BACKGROUND

Backing up computers is an important task in the everyday operation of computer systems. Backup may be required for retrieval of information in cases of human errors, technical failures, upgrades, or the like, as well as for legal or operational reasons.

Traditionally, systems used tapes for storing large amounts of data. Tapes are reliable and are considered environmentally friendly, i.e., do not waste energy unlike disks that spin constantly and consume energy. However, tapes have some significant drawbacks. For example, they take up a lot of physical space, and retrieving data from tapes may take a long time, for example in the order of magnitude of minutes, as compared to milliseconds in disks.

In addition, handling tapes necessitates manual labor. For example, operations such as making copies of tapes have to be done manually, creating backups at off-site locations cannot be performed without physically transporting them, or the like.

Further, when keeping data on tapes for long periods of time, such as years or decades, supporting tape drives have to be maintained in order to retrieve data from the tape when required. This drawback also implies that upgrading the used tape drive technology may be a complex operation.

Mainframe (MF) computers in general, and specifically those using the z/OS operating system, use disk storage for live or active data, but cannot use disk storage for backup or for archiving large amounts of data.

Some systems use virtual tapes for backing up mainframe computers. Virtual tapes are the same as physical tapes from the point of view of the MF operating system, while the data is physically written to disks and not to tapes. However, a virtual tape solution is still subject to the same limitations related to the number of mainframes that can connect or communicate with a storage device, and have to comply with the MF data protocols in order to emulate tape drives for the MF operating system. The same drawbacks are valid also for any storage equipment connecting to the MF.

US2005038830 discloses a method of distributing mainframe software and data using PC-based data media, comprising a mainframe program for converting a mainframe sequential dataset or all or part of a mainframe library of texts or load modules to a sequential dataset of fixed length records and for reverting these converted records to its original form in the same or another mainframe data center, and procedures for downloading the converted mainframe data to a PC and uploading the PC file to a mainframe. Keeps a file record in the MF, we receive in memory and immediately send out US2003088720 discloses a heterogeneous computer system, a heterogeneous input/output system and a data backup method for the systems. An I/O subsystem A for open system and an I/O subsystem B for a mainframe are connected by a communication unit. In order to back up the data from at least a disk connected to the I/O subsystem B in a MT library system and in order to permit the mainframe to access the data in the I/O subsystem B, the I/O subsystem A includes a table for assigning a vacant memory address in a local subsystem to the memory of the I/O subsystem for an open system. A request of variable-length record format received from the mainframe is converted into a fixed-length record format for the subsystem B. The disk designated according to the table is accessed, and the data thus obtained is sent to the mainframe and backed up in the back-up system.

US2007271302 discloses various data copy systems and methods for use in a disaster recovery network architecture including first, second and third computers and various datalinks coupling the first, second and third computers together. One embodiment of such a method includes: (1) transferring the data from the first computer to the second computer, (2) transferring the data from the second computer to the third computer only after the transferring the data from the first computer to the second computer is complete and (3) deleting the data from the second computer only after the transferring the data from the second computer to the third computer is complete.

U.S. Pat. No. 6,772,365B discloses a mainframe system disk control unit provided with apparatus for accessing open system storage connected to a SAN and apparatus for converting the input and output data format to that of the open system, and the mainframe is made to access a volume of open system storage in the same manner to a volume under control of the mainframe system disk control unit. Thus, data in the open system storage is backed up to the mainframe system. Communication is performed between the program on the mainframe and the program on the open system host computer, and prior to starting backup, the updating of data in the open system storage system is prohibited.

US2004044803 discloses a storage control apparatus comprising: a storage area A where data is stored according to a recording format alpha, the format alpha being a format in which an open computer reads/writes data; a storage area B where data is stored according to a recording format beta, the format beta being a format in which a mainframe computer reads/writes data; a data input/output unit x for receiving a data input/output request from the open computer, and inputting/outputting data to/from the storage area A in response to the request; a data input/output unit y for receiving a data input/output request from the mainframe computer, and inputting/outputting data to/from the storage area B in response to the request; and a data recording format conversion unit X capable of storing data stored in the storage area A according to the format alpha into the data storage area B according to the format beta.

US2004088507 relates to a computer system that includes a first computer, a second computer, a first storage apparatus storing data in a fixed-length block format used by the second computer, and a backup apparatus connected to the first computer and storing data in a variable-length block format, the present invention provides a backup method for backing up data stored in the first storage apparatus to the backup apparatus. The first computer sends the second computer a request to read data in the fixed-length block format. In response to this request, the second computer reads the fixed-length block format data from the first storage apparatus and transfers this data to the first computer. The first computer converts the transferred fixed-length block format data into variable-length block format data. The converted variable-length block format data is stored in the backup apparatus.

JP2004220484A relates to the problem of backing up the data of a main frame stored in a storage device connected only to the main frame in an open type backup device in a computer system with the main frame and an open type server. The disclosed solution is: when the data of the main frame stored in a first storage device connected to only the main frame is backed up, at first, a backup means in the side of the main frame stores a backup object file in the file stored in the first storage device in a second storage device connected to both of the main frame 100 and the open-type server. Then, a backup means in the side of the open-type server stores the backup object file stored in the second storage device 301 in a backup device.

BRIEF SUMMARY

One exemplary embodiment of the disclosed subject matter is a computer-implemented method comprising: receiving a request for backing up data from a mainframe on a backup server implemented on an open system; issuing a call to data set services, the call associated with an exit function; receiving a callback to the exit function, the callback associated with a data set record; packing the data set record to obtain packed information; and transmitting the packed information over a network connection to the backup server for backing up the data, wherein no additional data is written to a persistent memory of the mainframe, and wherein no limitations exit on a number of mainframes connected to the mainframe, or on a number of mainframes simultaneously communicating with the backup server. Within the method packing the data set record optionally comprises adding an ASCII header. Within the method transmitting the packed information to the backup server is optionally performed using TCP/IP protocol.

Another exemplary embodiment of the disclosed subject matter is a computer-implemented method comprising: receiving a request for restoring data from a backup server implemented on an open system, to a mainframe; issuing a call to data set services, the call associated with an exit function; receiving a callback to the exit function, the callback associated with a data set; transmitting a retrieval request to the backup server over network connection; receiving information from the backup server in response to the retrieval request over the network connection, wherein the information is retrieved from a storage device by the backup server; unpacking the information to retrieve a record; populating the data set with the record; and transmitting the data set to the data set services, in response to the exit function, for the data set services to store the data, wherein no additional data is written to a persistent memory of the mainframe, and wherein no limitations exit on a number of mainframes connected to the mainframe, or on a number of mainframes simultaneously communicating with the open system. Within the method, unpacking the information optionally comprises reading an ASCII header. Within the method, the information is optionally received from the backup server using TCP/IP protocol.

Yet another exemplary embodiment of the disclosed subject matter is a system for backup and restore mainframe data on a backup server, comprising: a processor; a communication component for communicating with a backup server; a backup agent adapted for: receiving a backup request, issuing a first call to data set services, the call associated with an exit function; receiving a first callback to the exit function, the first callback associated with a data set record; packing the data set record to obtain packed information; and transmitting the packed information over a network connection to the backup server, for backing up the data, the backup server implemented on an open system; and a restore agent adapted for: receiving a second request for restoring data from the backup server to the mainframe; issuing a second call to the data set services, the call associated with a second exit function; receiving a second callback to the second exit function, the second callback associated with a data set; transmitting a retrieval request to the backup server over the network connection; receiving information from the backup server in response to the retrieval request over the network connection, wherein the information is retrieved from a storage device by the backup server; unpacking the information to retrieve a record; populating the data set with the record; and transmitting the data set to the data set services, in response to the exit function, for the data set services to store the data, wherein no additional data is written to a persistent memory of the mainframe, and wherein no limitations exit on a number of mainframes connected to the mainframe, or on a number of mainframes simultaneously communicating with the open system. Within the system, unpacking the information optionally comprises reading an ASCII header. Within the system, the information is optionally received from the backup server using TCP/IP protocol.

Yet another exemplary embodiment of the disclosed subject matter is a computer program product comprising a computer readable storage medium retaining program instructions, which program instructions when read by a processor, cause the processor to perform a method comprising: performing a backup operation, comprising: receiving a request for backing up data from a mainframe on a backup server implemented on an open system; issuing a call to data set services, the call associated with an exit function; receiving a callback to the exit function, the callback associated with a data set record; packing the data set record to obtain packed information; and transmitting the packed information over a network connection to the backup server for backing up the data; and performing a restore operation, comprising: receiving a request for restoring data from a backup server implemented on an open system, to a mainframe; issuing a call to data set services, the call associated with an exit function; receiving a callback to the exit function, the callback associated with a data set; transmitting a retrieval request to the backup server over network connection; receiving information from the backup server in response to the retrieval request over the network connection, wherein the information is retrieved from a storage device by the backup server; unpacking the information to retrieve a record; populating the data set with the record; and transmitting the data set to the data set services, in response to the exit function, for the data set services to store the data, wherein no additional data is written to a persistent memory of the mainframe, and wherein no limitations exit on a number of mainframes connected to the mainframe, or on a number of mainframes simultaneously communicating with the backup server.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
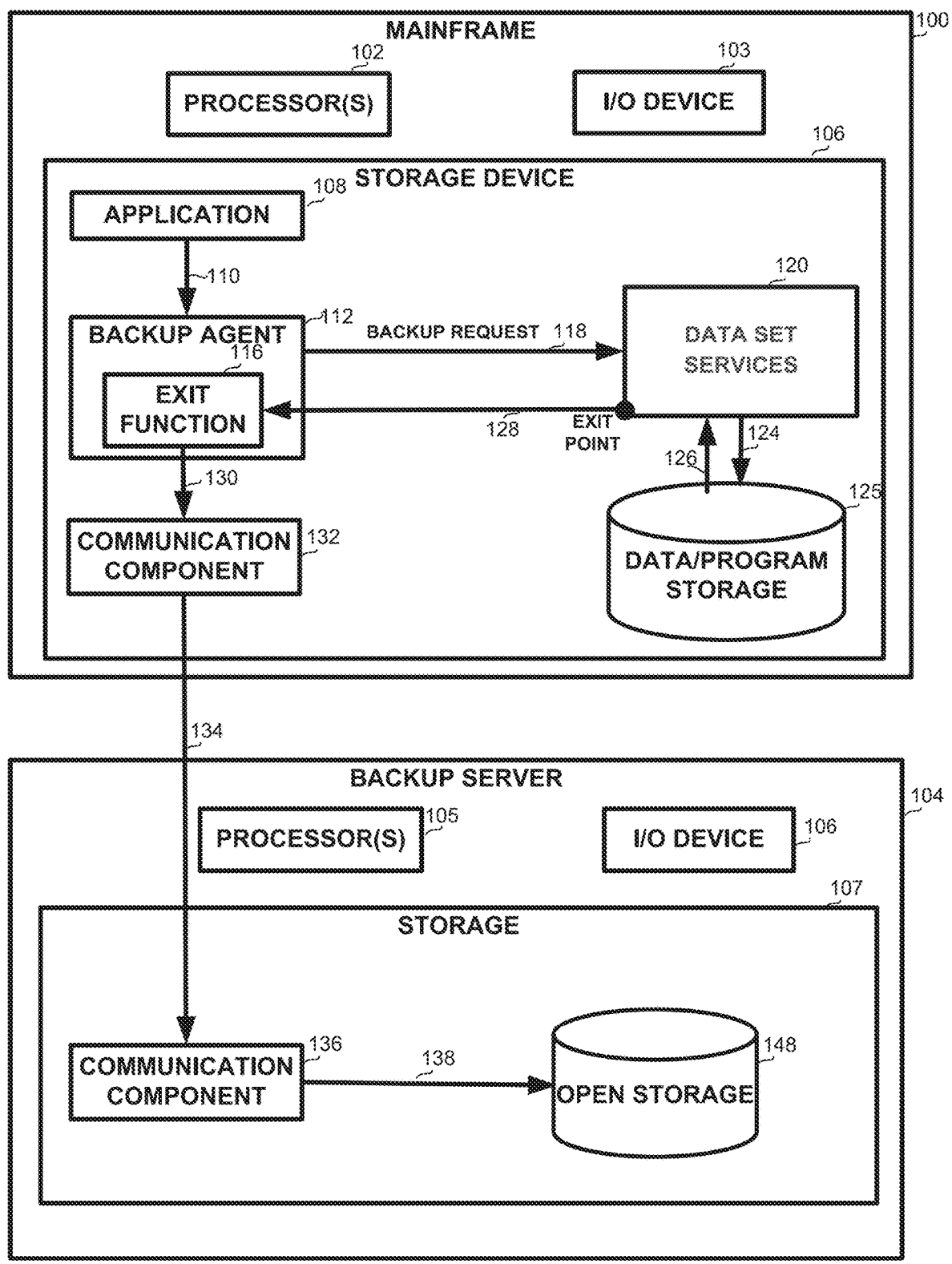
FIG. 1 shows a block diagram of an apparatus and control flow for backing up data from a mainframe computer on a backup server, in accordance with some exemplary embodiments of the subject matter.

One technical problem dealt with by the disclosed subject matter is the need to backup data from a mainframe computer to disks, Currently, mainframe (MF) computers, and particularly those using the z/OS operating system, use tapes for backing up and creating archive copies of data. The z/OS operating system was not designed to manage large amounts of data on disk, and a number of limitations prohibit such uses, including for example limitations on the size of a disk connected to a MF, which is currently about 1 TB, a limit on the number of mainframes that can be concurrently connected to a disk, and the serialization limitations that allow only one mainframe to read or write to a disk at any given time.

Using tapes for backup have significant disadvantages, including but not limited to: high price, high cost of storing the tapes, long retrieval time, the need to maintain adequate hardware, software and experienced personnel, difficulties in upgrading systems, significant labor required for creating a copy or storing the data at a remote location, pricey management software, and others.

Some systems use virtual tapes, which appear as physical tapes to the MF operating system. The z/OS still accesses and manages the storage devices as tape drives, although the actual storage is on disks. However, since the MF uses the same capabilities, and accesses the devices using the same protocols, such as ECKD commands going over the FICON fiber channel protocol, the same limitations apply, such as the number of mainframes a backup device can connect to, the inability to simultaneously access a backup system from two mainframes, the need to use and maintain expensive management tools for the stored information, and others.

There is thus a need to provide a solution for backing up MF systems on open systems disks, such that the MF systems can utilize, similarly to other systems, fast, reliable, cheap and widely available storage, without the current limitations and drawbacks.

One technical solution comprises a system for providing a disk-based backup and archive solution for MF computers. The system, which may be implemented as software, has a client component executed by the MF operating system, and a server component executed by the open storage system. The client component connects the MF computer to the open system using standard network connectivity. The client component may avoid using the proprietary MF data protocols such as the extended Count Key Data (ECKD) commands over Fiber Connection (FICON) protocols. Rather, the connectivity between the client and the server may be carried out using interfaces such as cloud storage-like interfaces. The client component, referred to as client or agent, may be executed by the z/OS operating system and may provide interfaces to backup, restore, archive or recall a file, also referred to as a data set, and disks, also referred to as volumes.

It will be appreciated that the term open system may relate to most systems which are not mainframes, such as any Windows, Linux, Intel processor based system, or the like.

The client may read into memory, also referred to as main storage, the different types of data sets, organize them into transferrable units, and send them efficiently to the backup server over the network.

The client may use any existing mainframe backup or restore system or component provided on a mainframe, referred to as native backup or restore system. The native backup or restore system may call an exit function provided as part of the client, which provides or receives data. Exit functions may sometime be referred to as callback functions.

When it is required to backup data on an open system, the client application may invoke a function of the native backup system. When an exit function implemented by the client is called back and receives a data record as a parameter, the record may be arranged, for example packed, compressed, encoded or encrypted, and transferred to the backup server using any available protocol, such as but not limited to TCP/IP.

While some prior art systems use the File Transfer Protocol (FTP), it will be appreciated that FTP cannot be used for transferring all existing data set types. FTP may therefore be inadequate in some situations, while TCP/IP or a protocol using TCP/IP does enable transferring all set types.

When it is required to restore data from an open system, the agent application may invoke a function of the native backup system. When an exit function implemented by the client is called back, and receives as a parameter a memory area to which the data is to be written, the client may communicate with the open storage system using any available protocol, such as but not limited to TCP/IP, may receive data, unpack the data, and transmit it to the native restore system, which may write it to the local or another storage device.

Thus, interactions between the backup server and agent include efficiently transferring large amounts of data between the agent and the server. Existing solutions write the backed up or archived data to a tape or a virtual tape, using ECKD read/write commands over a fiber channel protocol called FICON. The disclosed method and apparatus eliminate the usage of FICON and use network connectivity. In addition, the disclosed method and apparatus do not write the data it is required to backup to any persistent location on the mainframe.

MF data sets are record-based encoded in EBCDIC, while open systems files are ASCII encoded byte stream based. Therefore, each cylinder (for full volume image) or track (for data set backup) of the MF is packed when sent to the backup server. A track package consists of an ASCII header describing the track, which is added by the agent on the MF, and followed by compressed binary data set records, possibly encoded in EBCDIC. The ASCII header can be manipulated on the backup server and may be used for management in an open environment. The headers also contain a hash value and a message digest for the track in order to assist during incremental data set backup to check whether the track is already backed up. A cylinder is backed up in the same manner, with an additional indication that it is a group of 15 tracks.

One technical effect of the disclosure relates to a disk-based backup system and method for MF computers. The backup provides reliable and efficient backup, which stores the data on disks rather than on tapes. This provides for a modern cost effective solution, in which there is no limit on the number of mainframes that may connect to a disk, the number of disks a mainframe can connect to, and the number of mainframes that can simultaneously read or write from the disk.

Referring now to FIG. 1, showing a block diagram of an apparatus and control flow for backing up data from a mainframe computer on a backup server implemented on an open system. The apparatus is implemented as a cent or an agent on a mainframe 100. A mainframe computer is a computer used primarily by large organizations for critical applications, bulk data processing, industry and consumer statistics, enterprise resource planning, transaction processing, or other tasks.

Mainframe 100 may comprise a processor 102. Processor 102 may be a Central Processing Unit (CPU), a microprocessor, an electronic circuit, an Integrated Circuit (IC), a Central Processor (CP), a System z Information Integration Processor (zIIP), a System z Application Assist Processor (zAAP), or the like. Processor 102 may be utilized to perform computations required by the apparatus or any of its subcomponents. In some exemplary embodiments of the disclosed subject matter, mainframe 100 may comprise an Input/Output (I/O) device 103 such as a display, a pointing device, a keyboard, a touch screen, or the like. I/O device 103 may be utilized to provide output to and receive input from a user.

In some exemplary embodiments of the disclosed subject matter, mainframe 100 may comprise a storage device 106. Storage device 106 may be a hard disk drive, a Flash disk, a Random Access Memory (RAM), a memory chip, real storage, main storage or the like. In some exemplary embodiments, storage device 106 may retain program code operative to cause processor 102 to perform acts associated with any of the programs executed by mainframe 100. The components detailed below may be implemented as one or more sets of interrelated computer instructions, executed for example by processor 102 or by another processor. The components may be arranged as one or more executable files, dynamic libraries, static libraries, methods, functions, services, or the like, programmed in any programming language and under any computing environment.

Storage device 106 may comprise application 108, which may be an MF storage administrator for backing up, a service invoked according to a schedule or upon demand, a part of another program, or the like. Alternatively, application 108 may refer to a user activating a backup operation.

Storage device 106 may comprise backup agent 112, which may be implemented as software and may comprises code for receiving data to be backed up as detailed below.

Storage device 106 may further comprise or be operatively connected to data/program storage 125, parts or all of which it is required to backup or restore.

Storage device 106 may also comprise data set services 120, such as but not limited to Data Facility Storage Management Subsystem Data Set Services (DFSMSdss).

DFSMSdss is a direct access storage device (DASD) data and space management tool that operates on DASD volumes only in the z/OS environment.

Data set services 120 may provide for reading data set level or volume level from data/program storage 125. In particular, DFSMSdss may be used for the following tasks:

Copy and move data sets between volumes of like and unlike device types. Like devices may have the same track capacity and number of tracks per cylinder (for example, 3380 Model D, Model E, and Model K). Unlike DASDs may have different track capacities (for example, 3380 and 3390), a different number of tracks per cylinder, or both;

Dump and restore data sets, entire volumes, or specific tracks;

Convert data sets and volumes to and from storage management subsystem (SMS) management;

Compress partitioned data sets;

Release unused space in data sets; and

Reduce or eliminate DASD free space fragmentation by consolidating free space on a volume, or consolidating data set extents.

Backup agent 112 may comprise or otherwise point at one or more exit functions 116, the location of which is provided to data set services 120 when invoked. At particular points during execution, data set services 120 may call exit function 116.

Backup agent 112 may thus receive input from data set services 120, which is native to mainframe 100, since data set services 120 have internal information of the different data set formats and structures, and is used for encapsulating the data set access. This allows the code to support read, write, backup/a or archive of any data set type in mainframe 100, without knowing its internal formats and structures, including for example very old types as well as future types. Interaction with DFSMSdss may be based on the user interaction module (UIM) support provided by the DFSMSdss application programming interface (API). The UIM exit functions may be configured to:

Replace, insert, delete, or modify a SYSIN record after DFSMSdss has read it or a SYSPRINT record when DFSMSdss is ready to print it, wherein printing may relate to providing a way to examine the content of a record usually stored on a disk for purposes such as diagnostics;

Replace, insert, delete, or modify a write-to-operator message before DFSMSdss writes it;

Insert a statistics record during a logical dump operation;

Modify the installation options specified in the ADRUFO control block to override the specified options;

Bypass password and expiration-date checking, or reject the tape volume and request a scratch tape, when DFSMSdss is ready to open a tape;

Request a specific volume serial when a nonspecific tape is passed to DFSMSdss;

Get information about the data set being allocated;

End a task or processing of individual data sets;

Bypass authority checking for individual data sets;

Bypass serialization checking of individual data sets;

Show the status of the concurrent copy initialization, or

Specify some information on how a new target data is allocated.

Storage device 106 may comprise communication component 132 for communicating with other systems, such as backup server 104, via any required protocol, such as but not limited to TCP/IP.

Backup server may be any computing platform, such as a server, a desktop computer, or network appliance, code executing in a process of a storage controller, or the like.

Backup server 104 may comprise one or more processors 105, I/O device 109 and storage device 107, as described above for processors 102, I/O device 103 and storage device 106 of mainframe 100.

Storage device 107 may comprise communication component 136 for communicating with other systems, and in particular with communication component 132 of mainframe 100.

Storage device 107 may also comprise storage management system 140 for storing and retrieving data.

Storage device 107 may also comprise, or be operatively connected to open storage 148 storing the backed up data. It will be appreciated that open storage 148 may comprise any one or more storage units, on one or more devices, not necessarily collocated. Open storage 148 may relate to any one or more types of open storage, Flash storage, All-Flash-Array (AFA) storage, converged storage, hyper-converged storage, SCSI storage, iSCSI storage, NFS, NAS, SAN, file storage, block storage, object storage or any other.

Backup server 104, implemented on the open system and accessed through communication component 136, may be adapted to listen to restore or backup requests from the backup/restore agent of the mainframe, and may perform the I/O on its behalf Backup server 104 may be adapted to perform backup database management, including managing a database of backup copies. For each data set, one or more of the following items may be stored: a backup copy, the name of the backup server, the name of the data set, z/OS attributes, retention period, number of copies, physical location in the backup space, and possibly additional items. Backup server 104 may automatically delete backup copies when the retention period expires, when the number of backup copies exceeds the defined limit, or upon specific request.

Backup server 104 may also be adapted to perform cache management, wherein backup server 104 manages a large cache for coming backup commands. Data set copies are first written to the cache in order to improve response times, and later offloaded to the backup disk.

Backup server 104 may also be adapted to perform administration and reporting interface, which may be performed by providing a web interface for backup management. The user may input definitions via the interface, including definitions for one or more backup clients. It will be appreciated that all administration tasks may be performed on the server and not on the MF. The backup client may read its configuration on startup. The administration and reporting interface may also provide extensive reporting capabilities, including automatic notifications, for example sending 30 an e-mail to the storage administrator upon predetermined backup events.

Mainframe 100 and backup server 104 may be collocated or remote from each other, and communicate via any communication channel such as the Internet, Intranet, Local Area Network (LAN), Wide Area Network (WAN), or the like.

When it is required to back up data, application 108 may issue a backup command 110 to backup agent 112. Backup agent 112 may invoke data set services 120 by sending a backup request 116. Data set services 120 may send a request 124 to data/program storage 125, and may receive the required information 126. Backup agent 112 may provide the following functionalities:

Logical backup of a data set level, related to storing the logical data of a data set rather than its physical structure, which creates a backup copy of a data set. The data set is read, packed, possibly compressed, and sent to the backup server where the data is written to storage;

Incremental backup of a data set level, which creates a backup copy of a data set, wherein only the new, updated, erased or otherwise changed data is read, possibly compressed, packed and sent to the backup server for writing the data to storage. It will be appreciated that incremental backup is faster than logical backup, but necessitates the existence of a prior logical backup;

Archiving a data set, which creates a copy of a data set on the backup server and deletes the existing copy from the MF's disk. An archive action leaves an indication in the z/OS catalog, which is part of the Integrated Catalog Facility (ICF), that the data set is not on the disk anymore. The backup client component may listen to z/OS S213-04 ABENDs to determine whether a demand is issued for retrieving, also referred to as recalling, an archived data set; and Full backup of volume level, which creates a full backup image of the volume on the backup server. The MF disk is read by cylinders, one full cylinder at a time. Each cylinder is compressed, packed and sent to the backup server.

Backup agent 112 may thus support data set level backup/archive, or volume level backup functions, wherein each operation calls the corresponding DFSMSdss functions with the appropriate exit functions. In all cases, the DFSMSdss statements may be prepared dynamically as follows:

Allocating a temporary data set;

Writing a required DFSMSdss statements to the data set;

Pointing to the temporary data set using the DDNAME list block; and

Passing the DDNAME list block on the call to DFSMSdss module ADRDSSU.

For example, for data set level backup/archive functions the following DFSMSdss statements may be used:

```
DUMP DATASET (INCLUDE (selected_dataset_name)) —
    OUTDD (dummy_volume) OPTIMIZE (4) CONCURRENT —
    ADMIN CANCELERROR
```

In another example, for volume level backup functions, the following DFSMSdss statements may be used:

```
DUMP FULL INDY (selected_volume) —
    ALLDATA (*) ALLEXCP CANCELERROR    —
    ADMIN COMPRESS OPTIMIZE (4)        —
    CONCURRENT (PREFERRED)             —
    OUTDD (dummy_volume)
```

Once the required DFSMSdss statement for the required function is prepared, the DFSMSdss is invoked in its own task, using ATTACHX system service, for example as follows:

```
ATTACHX EP=ADRDSSU,
    PARAM= (OPTPTR, DDPTR, PAGEPTR, UIMPTR, UAPTR),
    VL=1
```

Data set services 120 may issue a call 128 to one or more exit functions 116, also referred to as callback functions, implemented as part of or separately from backup agent 112. Exit function 116 may receive control from data set services 120 for each data set record (representing a logical row in the file). In a non-limiting example for data set services 120, when DFSMSdss is called for either data set level backup or volume level backup, the UIM function exit points number 5 or 6 may be used for gaining control for each record to be stored. Exit point 5 is DFSMSdss writing logical tape record while exit point 6 is DFSMSdss writing physical tape record. The exit points are used for picking up DFSMSdss backup records, and sending them to the open system for backup.

Backup agent 112 may thus build the required data structure from each received data set record, package, encode, or encrypt it. Backup agent 112 may then transfer the data. Thus, the DFSMSdss output is all in memory, such that no record is stored in a persistent memory on the mainframe side. In some embodiments, backup agent 112 may package two or more records and send them together for backup.

Exit function 116 or another function of backup agent 112 may transfer the data 130 to communication component 132, which may transfer it to communication component 136 of backup server 104. Exit function 116 may be inline to the DFSMSdss function, i.e. its code may be interleaved with the dss code.

In some embodiments, communication component 136 may be implemented as part of backup agent 112, such that data is transmitted directly from backup agent 112 to communication component 136 of backup server 104. Data transmission may be done over a TCP/IP socket connection.

Communication component 136 of backup server 104, may then store the data on data/program storage 148.

On backup server 104, a file may be saved for each backup request. The file may store all dump records and maybe cataloged in a database along with metadata such as a file name, date and time, original data set name indicators, or other data. Each record may be saved with a prefix that includes the record length and a sequence number, which may be used for reconstructing the dump data set on the backup agent side on a restore/recall request.

The scenario described above allows for creating a file similar to the DFSMSdss dump data set on the backup server. On mainframe 100 side, the DFSMSdss dump data sets have a logical record length (LRECL), of 0 and an undefined record format (RECFM). Currently there is no direct way of downloading data sets with LRECL=0 and RECFM=U from the MF to an open system. The system and flow above allow for picking up the records before they are written to disk in z/OS, send one or more records at a time to the backup server such as backup server 104, such that the required file is created on backup server 104, without using any proprietary protocol which may enforce limitations, such as limitations on the number of mainframes that can connect to the backup server, the number of mainframes that can simultaneously communicate with the open system, or the like.

Figure 2:
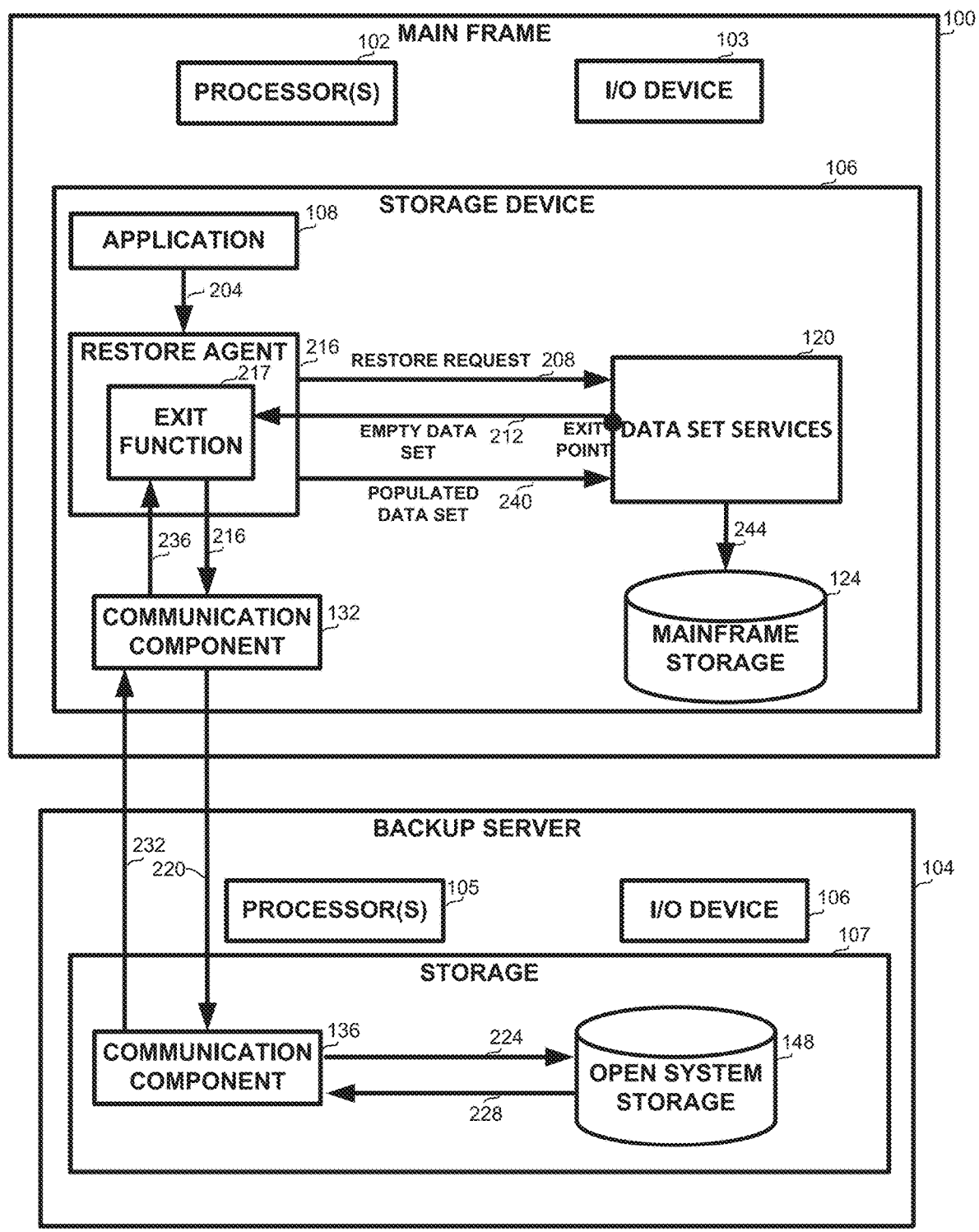
FIG. 2 shows a block diagram of an apparatus and control flow for restoring data from a backup server to a mainframe computer, in accordance with some exemplary embodiments of the subject matter.

Referring now to FIG. 2, showing a block diagram of an apparatus and control flow for restoring data from an open system to a mainframe computer.

The following components are substantially as described in association with FIG. 1 above: Mainframe 100, backup server 104, processors 102 and 105, I/O devices 103 and 105, storage devices 106 and 107, application 108, data set services 120, communication components 132 and 136 mainframe storage 124 and open system storage 148.

Backup server 104 may further comprise restore agent 216, for providing restore operations from backup server 104 to mainframe 100.

In some embodiments, backup agent 112 of FIG. 1 and restore agent 216 of FIG. 2 may be implemented as one backup/restore unit, such as a library, an executable, or the like. In further embodiments, backup agent 112 of FIG. 1 and restore agent 216 of FIG. 2 may be implemented separately.

Restore agent 216 may provide the following functionalities:

Data set restore, which reads the requested backup copy from the backup server and writes it to the MF disk. A data set may have to be reconstructed by retrieving the last logical backup and applying the changes of the incremental backups;

Data set level recall from archive, which writes an archive copy of the data set back to the MF's disk, deletes the archived copy from the backup server, and updates the z/OS catalog to reflect that the data set is no longer archived; and Volume level full restore, which writes a full volume image back from the backup server to the MF disk.

Thus, backup agent 112 and restore agent 216 combined provide for the full functionality of backup and restore operations required for a mainframe.

When application 108, such as a backup manager or a human user requires a restore operation, it sends a command 204 to restore agent 216. Restore agent 216 may then issue a restore request 208 to data set services 120, indicating one or more exit functions 217.

Restore request 208 may be constructed as follows:

For a non-System Managed Storage (SMS) data set level restore function, the following statement may be used:

```
RESTORE DS (INCLUDE(data_set_name))          -
RENAMEU (data_set_name,new_data_set_name)    -
INDD (DUMPIN) SPHERE TOL(ENQF) RECAT(*)      -
OUTDY(data_set_vol) BYPASSACS(**) NSC NMC
```

For an SMS managed data set level restore function, the following statement may be used:

```
RESTORE DS(INCLUDE(data_set_name))           -
RENAMEU(data_set_name,new_data_set_name)     -
INDD (DUMPIN) SPHERE TOL (ENQF) RECAT(*)     -
OUTDY (data_set_vol) STORCLAS (storage_class)—
MGMTCLAS (management_class)
```

For a volume level restore function, the following statement may be used:

```
RESTORE FULL INDD(DUMPIN) OUTDD (restore_target_volume) -
ADMIN CANCELERROR COPYVOLID
```

Once invoked with any of the above statements or a similar one, data set services 120 may then issue a call 212 to one or more of exit functions 217, possibly with a recreated temporary data set to be used as dump input for a DFSMSdss RESTORE process, by dynamically allocating it to a data definition (DD) named DUMPIN.

Exit function 217 may transmit a request 216 to communication component 132, which may transmit a further request 220 to communication component 136 of backup server 104. Communication component 136 may address a request 224 to open system storage 148.

Open system storage 148 may use its internal catalog to locate the file that contains the dump records. The dump records 228 may then be sent back to communication component 136. Communication component 136 may transmit the records 232 to communication component 132, from which the records 236 are sent back to exit function 217. Communication between communication component 136 and communication component 132 may be performed using TCP/IP or any other protocol. Exit function 217 may then populate the temporary data set as received on call 212 with the retrieved records and send the data set as response 240. In some embodiments, the data sets may be transmitted all the way from the backup to the DFSMSdss one by one. However, in alternative embodiments the data sets may be grouped into larger chunks.

Thus, no data is stored by backup agent 216 in a persistent memory during backup. Backup agent 216 may process the data received via the communication channel, and transmit it to data set services 120 which may restore the contents.

Figure 3:
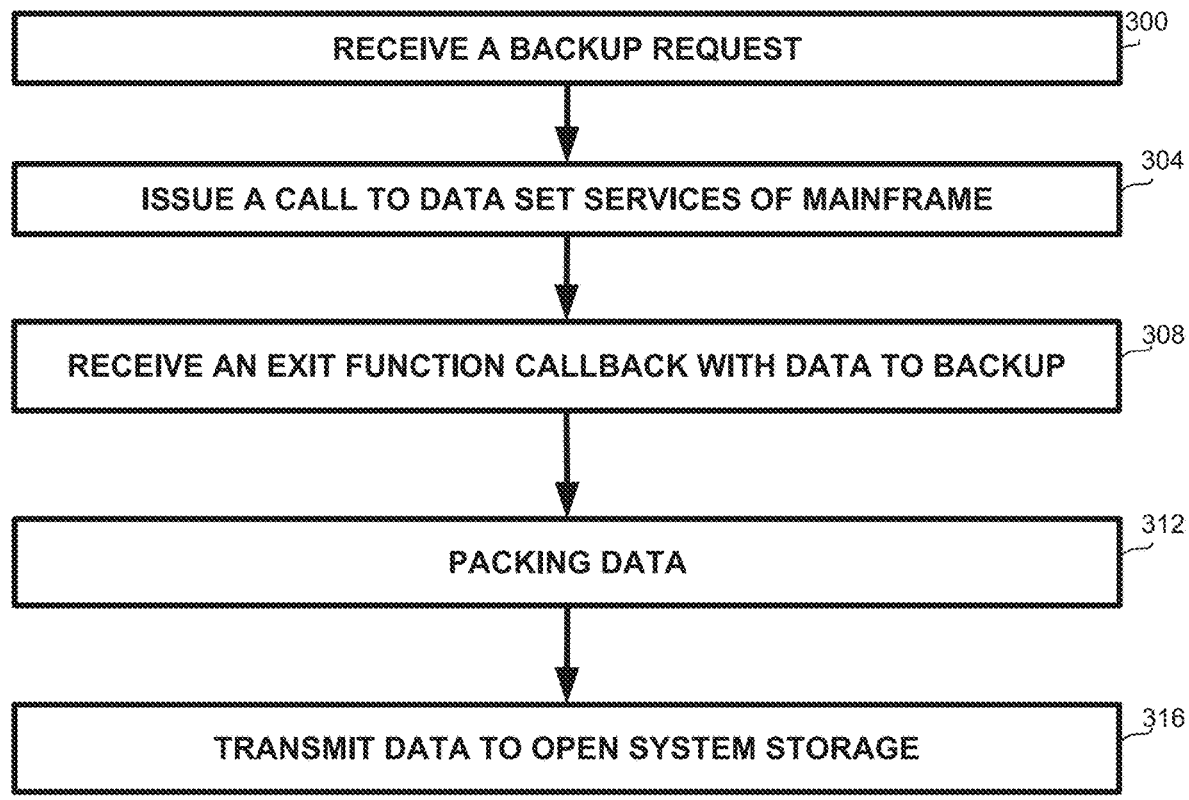
FIG. 3 is flowchart of steps in a method for backing up data from a mainframe computer on a backup server, in accordance with some exemplary embodiments of the subject matter.

Referring now to FIG. 3, showing a flowchart of steps in a method for backing up data from a mainframe computer on.

On step 300, a backup request may be received by a mainframe backup and restore unit, for example from a storage administrator, a human user, or the like.

On step 304, a call may be issued to data set services, such as DFSMSdss, to backup the required data set or volume. The call may contain or otherwise relate to an exit function to be called by the data set services when a data set record is available.

On step 308, the exit function may be called, with a data set record to backup, wherein the call may be referred to as a callback.

On step 312 the data may be packed, for example an ASCII header may be added, such that the backup server may store the data as well as additional information to be extracted from the header, for example the backup server may store metadata in an internal catalog.

On step 316, the packed data records may be transmitted, for example over TCP/IP to an open system for storage. The packed data records may be sent one at a time or grouped together.

The open system storage unit may then store the data and update its catalog, regardless of its original format.

Figure 4:
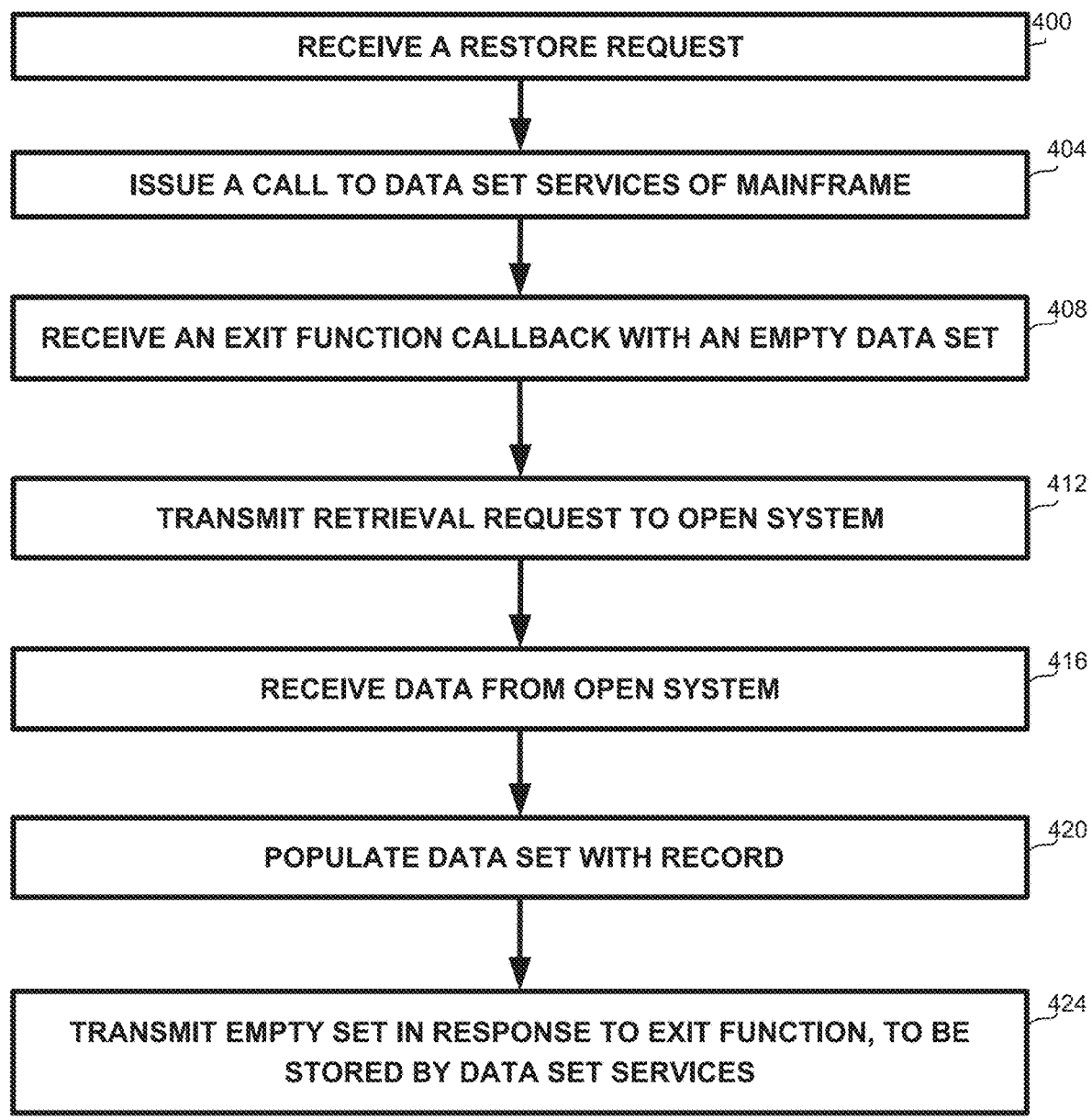
FIG. 4 is flowchart of steps in a method for restoring data from a backup server to a mainframe computer, in accordance with some exemplary embodiments of the subject matter.

Referring now to FIG. 4, showing a flowchart of steps in a method for restoring data from an open system to a mainframe computer.

On step 400, a restore request may be received by a mainframe backup and restore unit, for example from a storage administrator, a human user, or the like.

On step 404, a call may be issued to data set services, such as DFSMSdss, to restore the required data set or volume. The call may contain or otherwise relate to an exit function to be called by the data set services when data is to be received.

On step 408, the exit function may be called, with an empty data set, the call may be referred to as a callback.

On step 412, a request may be issued to an open storage system to retrieve the required data.

On step 416, the data may be received, for example as a sequence of records, from the open system. Communication between the mainframe and the open system may occur using TCP/IP or any other appropriate protocol.

On step 420, the data set record received in association with the exit function call of step 408 may be populated with the data, and on step 424 it may be returned to the data set services for storing.

Thus, the data, whether stored or backed up, is not stored on the mainframe as part of the backup but is only in volatile memory, and immediately transmitted for backup or restore. Additionally, the communication between the mainframe and the open system takes place using standard protocols such as TCP/IP, and is not limited to proprietary or dedicated mainframe protocols.

It will be appreciated that the system and method are not limited to backing up data of certain format or certain use, such as operating system information, but may be used also for backing up programs, data, databases, system resident volumes, non-system resident volumes, or any other information of any type, source or format.

The transformation of the data between the mainframe formats and the open system formats is done by the backup and restore agent on the mainframe, and not by the backup server. Further, handling the various formats is performed by a native utility that has knowledge of the se formats. Thus, the system and method may support any existing or future data format, without further enhancements.

Using standard protocols also provides for eliminating limitations applying when backing up or restoring data from tapes, including the number of mainframe systems that may connect to each storage system, the number of storage systems each mainframe can connect to, and the number of mainframes that can communicate with a storage system simultaneously.

The connection between the open system and the MF may be used for backup and retrieval. The backup system is not a part of the mainframe and is not directly connected to the mainframe, thus it can serve for backing up a multiplicity of mainframes of different types, and possibly other computers, without limitations the number of connected mainframes, the number of mainframes communicating with the backup server, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
receiving a request for backing up data from a mainframe that processes data sets in Extended Binary Coded Decimal Interchange Code (EBCDIC) format, to at least one storage device associated with a backup server that processes American Standard Code for Information Interchange (ASCII) encoded byte stream based files, the backup server implemented on an open system;
issuing a call to a Direct Access Storage Device (DASD) data and space management tool, the call associated with an exit function;
receiving a callback from the DASD data and space management tool to the exit function, the callback associated with a data set record;
packing the data set record, said packing comprises adding an ASCII header to obtain packed information; and
transmitting the packed information over a Transmission Control Protocol/Internet Protocol (TCP/IP) network connection to the backup server for backing up the data, thereby enabling a multiplicity of mainframes including the mainframe to simultaneously communicate with the backup server for backing up data;
wherein no additional data is written to a persistent memory of the mainframe, and
wherein no limitation exists on a number of mainframes connected to the mainframe.

2. The method of claim 1, wherein the mainframe uses variable length block format and the open system uses fixed length disk architecture.

3. A computer-implemented method comprising:
receiving a request for restoring data from at least one storage device associated with a backup server that processes ASCII encoded byte stream based files, the backup server implemented on an open system, to a mainframe that processes data sets in EBCDIC format;
issuing a call to a DASD data and space management tool, the call associated with an exit function;
receiving a callback from the DASD data and space management tool to the exit function, the callback associated with a data set;
transmitting a retrieval request to the backup server over TCP/IP network connection;
receiving information from the backup server in response to the retrieval request over the TCP/IP network connection, wherein the information is retrieved from the at least one storage device associated with the backup server;

unpacking the information to retrieve a record, said unpacking comprises removing an ASCII header;
populating the data set with the record; and
transmitting the data set over a TCP/IP network connection to the DASD data and space management tool, in response to the exit function, for the DASD data and space management tool to store the data, thereby enabling a multiplicity of mainframes including the mainframe to simultaneously communicate with the backup server for restoring data,
wherein no additional data is written to a persistent memory of the mainframe, and
wherein no limitation exits on a number of mainframes connected to the mainframe.

4. The method of claim 3, wherein the mainframe uses variable length block format and the open system uses fixed length disk architecture.

5. A system for backup and restore mainframe data on a backup server, comprising:
a processor;
a communication component for communicating with a backup server implemented on an open system;
a backup agent adapted for:
receiving a backup request for backing up data from a mainframe that processes data sets in EBCDIC format, to at least one storage device associated with the backup server that processes ASCII encoded byte stream based files, the backup server implemented on an open system,
issuing a first call to a DASD data and space management tool, the call associated with an exit function;
receiving a first callback from the DASD data and space management tool to the exit function, the first callback associated with a data set record;
packing the data set record to obtain packed information said packing comprises adding an ASCII header; and
transmitting the packed information over a TCP/IP network connection to the backup server, for backing up the data thereby enabling a multiplicity of mainframes including the mainframe to simultaneously communicate with the backup server for backing up data; and
a restore agent adapted for:
receiving a second request for restoring data from the at least one storage device associated with the backup server to the mainframe;
issuing a second call to the DASD data and space management tool, the call associated with a second exit function;
receiving a second callback from the DASD data and space management tool to the second exit function, the second callback associated with a data set;
transmitting a retrieval request to the backup server over the TCP/IP network connection;
receiving information from the backup server in response to the retrieval request over the TCP/IP network connection, wherein the information is retrieved from the at least one storage device by the backup server;
unpacking the information to retrieve a record, said unpacking comprises removing an ASCII header;
populating the data set with the record; and
transmitting the data set over the TCP/IP network connection to the DASD data and space management too, in response to the exit function, for the DASD data and space management too to store the data thereby enabling a multiplicity of mainframes including the mainframe to simultaneously communicate with the backup server for restoring data,
wherein no additional data is written to a persistent memory of the mainframe, and
wherein no limitation exists on a number of mainframes connected to the mainframe.

6. The method of claim 5, wherein the mainframe uses variable length block format and the open system uses fixed length disk architecture.

7. A computer program product comprising a computer readable storage medium retaining program instructions, which program instructions when read by a processor, cause the processor to perform a method comprising:
performing a backup operation, comprising:
receiving a request for backing up data from a mainframe that processes data sets in EBCDIC format, to at least one storage device associated with a backup server that processes ASCII encoded byte stream based files the backup server implemented on an open system;
issuing a call to a DASD data and space management tool, the call associated with an exit function;
receiving a callback from the DASD data and space management tool to the exit function, the callback associated with a data set record;
packing the data set record, said packing comprises adding an ASCII header to obtain packed information; and
transmitting the packed information over a TCP/IP network connection to the backup server for backing up the data thereby enabling a multiplicity of mainframes including the mainframe to simultaneously communicate with the backup server for backing up data; and
performing a restore operation, comprising:
receiving a request for restoring data from a backup server that processes ASCII encoded byte stream based files implemented on an open system, to a mainframe that processes data sets in EBCDIC format;
issuing a call to the DASD data and space management tool, the call associated with an exit function;
receiving a callback from the DASD data and space management tool to the exit function, the callback associated with a data set;
transmitting a retrieval request to the backup server over the TCP/IP network connection;
receiving information from the backup server in response to the retrieval request over the TCP/IP network connection, wherein the information is retrieved from a storage device by the backup server;
unpacking the information to retrieve a record, said unpacking comprises removing the ASCII header;
populating the data set with the record; and
transmitting the data set over the TCP/IP network connection to the DASD data and space management tool, in response to the exit function, for the DASD data and space management tool to store the data, thereby enabling a multiplicity of mainframes including the mainframe to simultaneously communicate with the backup server for restoring data,
wherein no additional data is written to a persistent memory of the mainframe wherein no limitation exists on a number of mainframes connected to the mainframe.

8. The method of claim 7, wherein the mainframe uses variable length block format and the open system uses fixed length disk architecture.

\* \* \* \* \*